(12) United States Patent
Weston et al.

(10) Patent No.: US 7,161,635 B1
(45) Date of Patent: Jan. 9, 2007

(54) VIDEO SIGNAL PROCESSING

(75) Inventors: Martin Weston, Hampshire (GB);
William Beningfield Collis,
Southampton (GB)

(73) Assignee: Snell & Wilcox Limited, Hampshire (GB)

( * ) Notice: Subject to any disclaimer, the term of this patent is extended or adjusted under 35 U.S.C. 154(b) by 0 days.

(21) Appl. No.: 09/700,321

(22) PCT Filed: May 17, 1999

(86) PCT No.: PCT/GB99/01574

§ 371 (c)(1),
(2), (4) Date: Jan. 16, 2001

(87) PCT Pub. No.: WO99/60780

PCT Pub. Date: Nov. 25, 1999

(30) Foreign Application Priority Data

May 15, 1998 (GB) ................... 9810555.4

(51) Int. Cl.
*H04N 5/21* (2006.01)

(52) U.S. Cl. ............... 348/625; 348/448; 348/627

(58) Field of Classification Search ........... 348/600, 348/625–629, 630, 631, 252, 253, 676; 382/275, 382/236, 261
See application file for complete search history.

(56) References Cited

U.S. PATENT DOCUMENTS

| 4,446,484 A | | 5/1984 | Powell |
| 4,989,987 A | * | 2/1991 | Berryman et al. ............ 366/65 |
| 5,003,618 A | | 3/1991 | Meno |
| 5,086,488 A | | 2/1992 | Kato et al. |
| 5,142,380 A | | 8/1992 | Sakagami et al. |
| 5,249,053 A | | 9/1993 | Jain |
| 5,438,625 A | * | 8/1995 | Klippel ........................ 381/96 |
| 5,512,956 A | * | 4/1996 | Yan ............................ 348/606 |
| 5,629,779 A | | 5/1997 | Jeon |
| 5,642,115 A | | 6/1997 | Chen |
| 5,652,620 A | | 7/1997 | Sugiura et al. |
| 5,671,298 A | | 9/1997 | Markandey et al. |
| 5,748,245 A | | 5/1998 | Shimizu et al. |
| 5,802,118 A | * | 9/1998 | Bliss et al. .................. 375/350 |
| 5,802,218 A | * | 9/1998 | Brailean ..................... 382/275 |
| 5,831,688 A | | 11/1998 | Yamada et al. |
| 5,930,398 A | | 7/1999 | Watney |
| 5,991,456 A | * | 11/1999 | Rahman et al. ............. 382/254 |
| 6,005,952 A | * | 12/1999 | Klippel .................... 381/71.11 |
| 6,088,388 A | * | 7/2000 | Slavin ........................ 375/229 |
| 6,151,362 A | | 11/2000 | Wang |
| 6,163,573 A | | 12/2000 | Mihara |
| 6,181,382 B1 | | 1/2001 | Kieu et al. |
| 6,269,120 B1 | | 7/2001 | Boice et al. |
| 6,278,735 B1 | | 8/2001 | Mohsenian |
| 6,335,990 B1 | * | 1/2002 | Chen et al. .................. 382/261 |
| 6,427,031 B1 | | 7/2002 | Price |
| 6,437,827 B1 | * | 8/2002 | Baudouin ................... 348/453 |
| 6,539,120 B1 | * | 3/2003 | Sita et al. .................... 382/233 |
| 6,570,922 B1 | | 5/2003 | Wang et al. |

* cited by examiner

*Primary Examiner*—David Ometz
*Assistant Examiner*—Trang U. Tran
(74) *Attorney, Agent, or Firm*—Michael Best & Friedrich LLP

(57) ABSTRACT

A method of de-interlacing a video signal by conducting three linear filtering operations on the input to produce three filtered signals, each linear filtering operation comprising the taking of a weighted sum of pixels; and multiplying together the three filtered signals to produce an output video signal.

15 Claims, 1 Drawing Sheet

VIDEO SIGNAL PROCESSING

This invention relates to video signal processing and is particularly concerned with non-linear filtering.

It has been found that in a wide variety of video signal processes—including de-interlacing, decoding, enhancement, noise reduction, and standards conversion—considerable advantage can be secured by the use of complex non-linear filters. It has been found in particular that polynomial filters can be very useful. In many applications, quadratic behaviour in the filter is not sufficient and third or higher orders are typically necessary. Where real time operation is required, hardware implementations are usually essential and the hardware costs of such high order polynomial filters are substantial.

It is an object of the present invention to provide improved methods and apparatus in video signal processing which offer third or higher order behaviour in a relatively simple filter architecture.

Accordingly, the present invention consists, in one aspect, in a method of video signal processing, comprising the steps of conducting three linear filtering operations on an input video signal to produce three filtered signals, each linear filtering operation comprising the taking of a weighted sum of pixels; and multiplying together said three filtered signals to produce an output video signal.

Suitably, the weighted sum is taken over pixels of the input video signal defined by a filter aperture and, preferably, all three linear filtering operations have the same filter aperture.

In one embodiment, for at least one linear filtering operation, the taking of a weighted sum of pixels includes the output pixel of the respective linear filtering operation.

In another aspect, the present invention consists in apparatus for video signal processing comprising an input terminal for receiving an input video signal; first, second and third linear filters each connected with the input terminal and arranged to provide an output through taking a weighted sum of pixels; a first multiplier for multiplying together the respective outputs of the first and second filters; and a second multiplier for multiplying together the respective outputs of the first multiplier and the third filter to produce an output video signal.

Advantageously, a filter is interposed between the output of the first multiplier and the second multiplier.

Preferably, the apparatus further comprises a linear filter path connected with the input terminal, and a combiner for combining the outputs of the linear filter path with the output of said second multiplier.

Suitably, a filter is interposed between the output of the second multiplier and said combiner.

Figure 1:
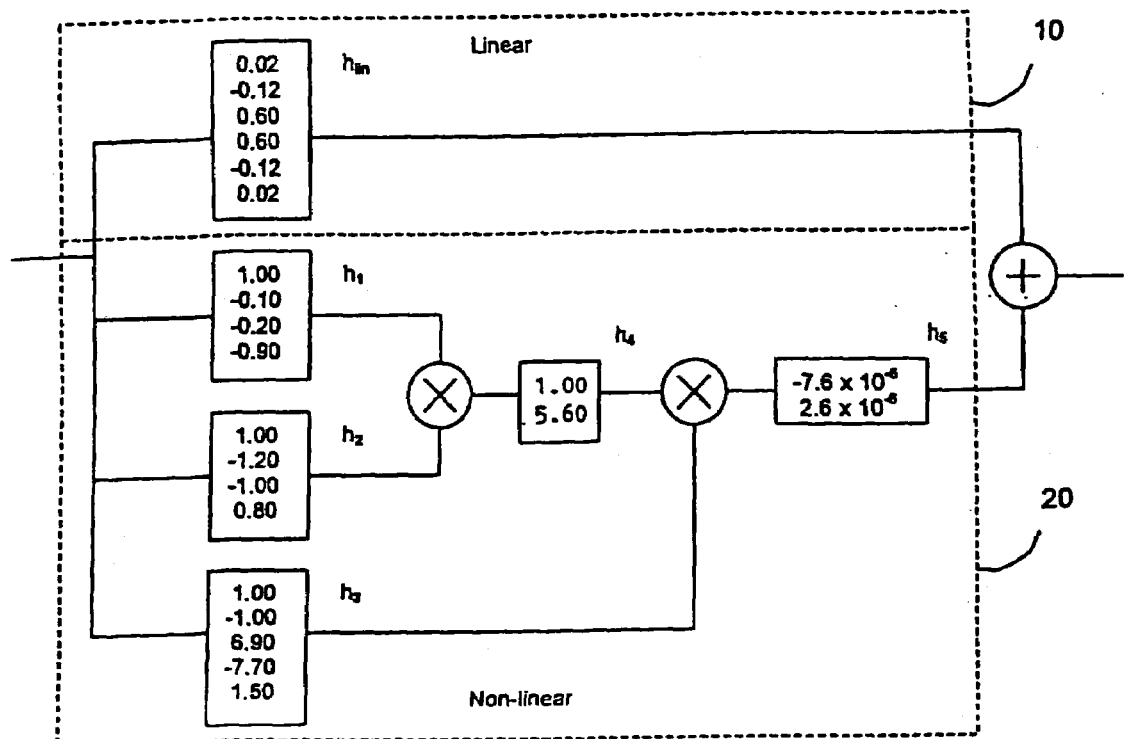
Figure 2:
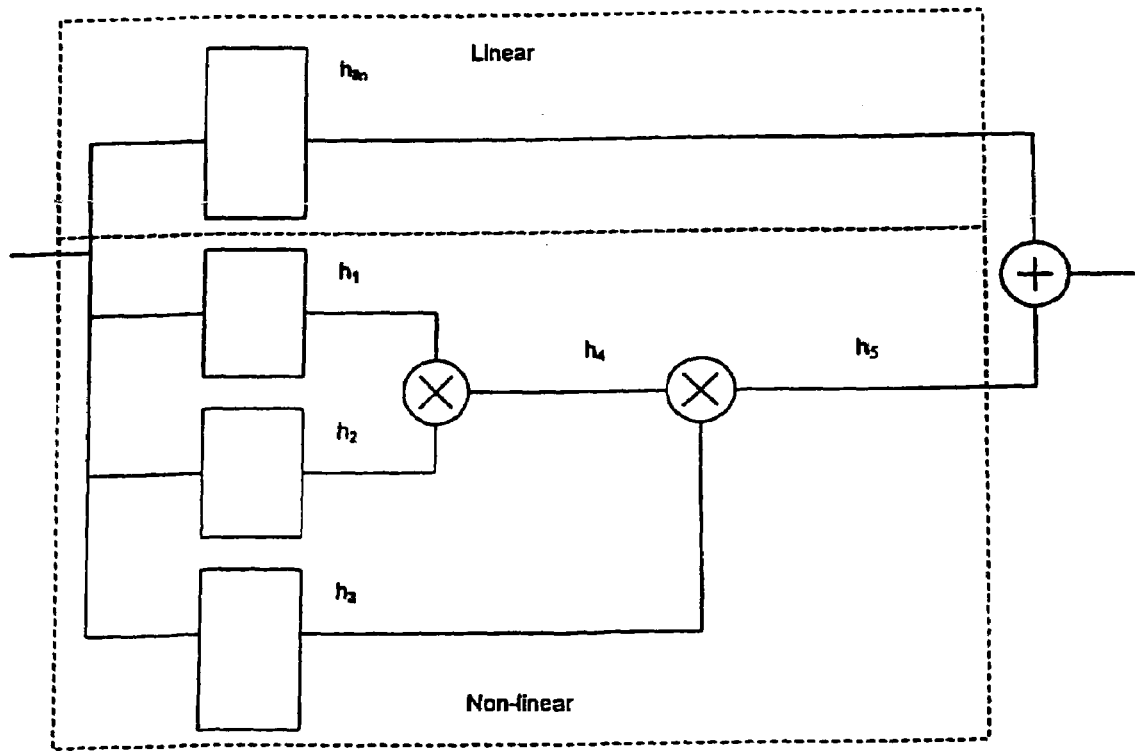

The invention will now be described by way of example with reference to the accompanying drawings in which:

FIG. 1 is a block diagram of video signal processing apparatus according to the invention, in the form of a vertical de-interlacing filter; and FIG. 2 is a diagram similar to FIG. 1, illustrating a modification.

The example will be taken of a de-interlacer and, for reasons of clarity, a de-interlacer will be described that utilises only vertical information. It will be understood that horizontal and temporal information could be included in ways which will immediately evident to the skilled reader.

In FIG. 1, the new architecture can be seen to consist of two signal paths. A linear signal path 10 contains a traditional, vertical, six tap, linear filter ($h_{lin}$) which has a typical $\sin(x)/x$ structure. If this were to be used without the non-linear signal path it would produce reasonable pictures, but they would contain some artefacts due to the interpolation process, notably jagging on diagonal and curved edges.

In the non-linear signal path 20, the output of two four point linear filters ($h_1$ and $h_2$) are multiplied together and passed through a two point linear filter ($h_4$). The output of this is then multiplied with the output of a five point linear filter ($h_3$). The resulting signal is filtered through another two point linear filter ($h_5$) before being added on to the linear path. Although in this case the filter lengths are 4, 5 and 2, larger filters with more taps can be used to give better results. The lengths (or more generally, the sizes) of the filters need not be related and can be made larger or smaller to provide different trade-offs between quality and cost.

It will be recognised that the arrangement of FIG. 1 serves to generate the "missing" lines in a de-interlacing operation. These new lines will be combined in a multiplexer with the (suitably delayed) "original" lines.

The filter coefficients can be selected by 'training' the filter on real pictures. In this example of de-interlacing, a still frame is taken and split into fields. A set of coefficients is used to estimate Field 2 from Field 1 and the mean squared error between the estimate of Field 2 and the original Field 2 is measured. A genetic algorithm can then be used to search the multi-dimensional filter space for the set of filter coefficients that gives the lowest mean squared error.

If the described non-linear de-interlacer is tested on the EBU/SMPTE test picture "Girl with Toys", the non-linear path is found to reduce the average mean squared error by approximately 15% with respect to the linear filter. There is also a noticeable reduction in jagging.

A polynomial filter with the same number of input pixel taps produces an almost equivalent reduction in error. However, a major advantage of this new architecture over the polynomial filter can be seen by considering the number of multiplications of pixels; multiplications of pixels by a constant; and additions, that each filter requires. These are shown in Table 1.

TABLE 1

Comparison of complexity of filters

|  | Polynomial Filter | New Architecture |
| --- | --- | --- |
| Multiplication | 50 | 2 |
| Multiplication by a constant | 34 | 23 |
| Additions | 34 | 24 |

It can be seen that the largest reduction is in the multiplication of pixels. This is particularly significant as these are the most expensive to implement.

In summary, the new architecture is able to reduce many of the artefacts associated with traditional linear interpolation whilst being relatively simple to implement.

FIG. 2 illustrates a modification in which the architecture is simplified through omission of the filters $h_4$ and $h_5$. In other words, the direct product is formed of the outputs of filters $h_1$, $h_2$ and $h_3$ without intervening filtering of the product of the outputs of filters $h_1$ and $h_2$. This may under some circumstances produce less ideal filter behaviour, but the reduction in hardware complexity will often more than compensate. A particular advantage is that the three remaining filters can all make use of the same memory architecture.

It should be understood that this invention has been described by way of example only and that a wide variety of modifications are possible without departing from the scope of the invention. Thus, whilst the separation into linear and non-linear paths offers important advantages, such as the option to preserve higher bit accuracy in the linear path, it will not always appropriate. Similarly, the described use of vertical filters is—as has been explained—merely an example. Horizontal, vertical and temporal filters can be employed and filters can have one, two or three of these dimensions. Whilst Finite Impulse Response (FIR) filters will be important, the invention also encompasses other forms of linear filter such as recursive filters which include The output pixel in the weighted sum. The filters which are to be multiplied together need not be of the same category. However, providing three FIR or transversal filters with the same filter aperture ensures that in the multiplication of the three filtered signals, all possible cross products of input pixels are made available.

It will be recognised that although de-interlacing has been chosen as an example, filters according to the present invention can be applied to other problems in video processing, including composite to component decoding, enhancement, noise reduction, up and down conversion and standards conversion.

The invention claimed is:

1. A method of video signal processing, comprising the steps of conducting three linear filtering operations on an input video signal to produce three filtered signals, a first signal, a second signal, and a third signal, each linear filtering operation comprising the taking of a weighted sum of pixels; and multiplying the first signal and the second signal to form the product of the first signal and the second signal and multiplying the third signal and the product of the first signal and the second signal to produce an output video signal being the product of the first signal, the second signal and the third signal.

2. A method according to claim 1, wherein said weighted sum is taken over pixels for the input video signal defined by a filter aperture.

3. A method according to claim 2, wherein all three linear filtering operations have the same filter aperture.

4. A method according to claim 1, wherein, for at least one linear filtering operation, the taking of a weighted sum of pixels includes the output pixel of the respective linear filtering operation.

5. A method according to claim 1, wherein said three filtered signals are multiplied together without intervening filtering of the three filtered signals.

6. Apparatus according to claim 5, wherein a filter is interposed between the output of the second multiplier and said combiner.

7. A method according to claim 1, wherein a further linear filtering operation is conducted in parallel on the input video signal, with the result of said further linear filtering operation being combined with the multiplication product of said three filtered signals to produce an output video signal.

8. A method of video signal processing, comprising the steps of conducting three linear filtering operations on an input video signal to produce three filtered signals, each linear filtering operation comprising the taking of a weighted sum of pixels; and multiplying together said three filtered signals to produce an output video signal, wherein the product of two of said filtered signals is formed and a linear filtering operation conducted on that product, prior to multiplication of said product by the third filtered signal.

9. Apparatus for video signal processing comprising an input terminal for receiving an input video signal; first, second and third linear filters each connected with the input terminal and arranged to provide an output through taking a weighted sum of pixels; a first multiplier for multiplying together the respective outputs of the first and second filters; and a second multiplier for multiplying together the respective outputs of the first multiplier and the third filter to produce an output video signal.

10. Apparatus according to claim 9, wherein said weighted sum is taken over pixels of the input video signal defined by a filter aperture.

11. Apparatus according to claim 10, wherein said three linear filters have the same filter aperture.

12. Apparatus according to claim 9, wherein at least one linear filter is arranged to take a weighted sum of pixels which includes the output pixel of the respective linear filter.

13. Apparatus according to claim 9, wherein there is further provided a linear filter connected between the output of said first multiplier and the input to said second multiplier.

14. Apparatus according to claim 9, wherein there is a direct connection between the output of said first multiplier and the input to said second multiplier.

15. Apparatus according to claim 9, wherein the apparatus further comprises a linear filter path connected with the input terminal, and a combiner for combining the outputs of the linear filter path with the output of said second multiplier.

* * * * *

UNITED STATES PATENT AND TRADEMARK OFFICE
CERTIFICATE OF CORRECTION

PATENT NO. : 7,161,635 B1
APPLICATION NO. : 09/700321
DATED : January 9, 2007
INVENTOR(S) : Martin Weston and William Beningfield Collis Page 1 of 1

It is certified that error appears in the above-identified patent and that said Letters Patent is hereby corrected as shown below:

Column 1, line 63: "ways which will immediately evident to the skilled reader" should be stated --ways which will be immediately evident to the skilled reader--

Column 3, line 12, first word: "The" should begin with a lower case --t--

Signed and Sealed this

Tenth Day of April, 2007

JON W. DUDAS
*Director of the United States Patent and Trademark Office*